March 25, 1924.
M. WOOLF
VEHICLE SIGNAL
Filed Dec. 4, 1920
1,487,997
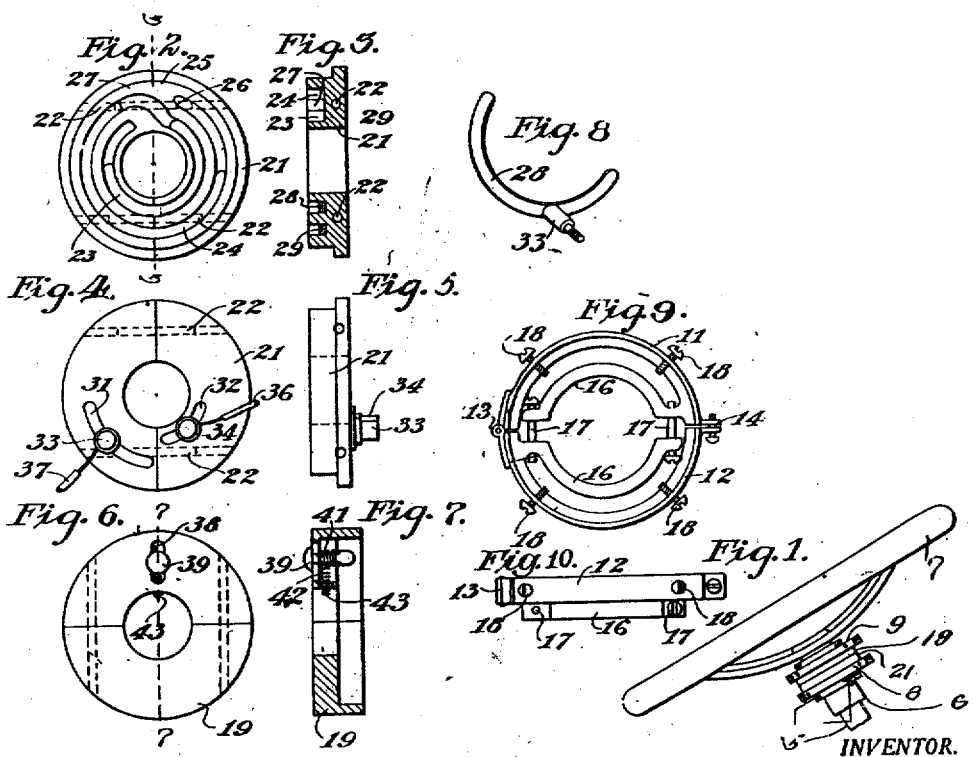
INVENTOR.
Milton Woolf.
BY Victor J. Evans
ATTORNEY.

Patented Mar. 25, 1924.

1,487,997

UNITED STATES PATENT OFFICE.

MILTON WOOLF, OF SAN FRANCISCO, CALIFORNIA.

VEHICLE SIGNAL.

Application filed December 4, 1920. Serial No. 428,296.

*To all whom it may concern:*

Be it known that I, MILTON WOOLF, a citizen of the United States, residing at San Francisco, in the county of San Francisco and State of California, have invented new and useful Improvements in Vehicle Signals, of which the following is a specification.

This invention relates to improvements in direction indicators, and has particular reference to that type of indicators which are adapted to be applied to a vehicle for the purpose of indicating to a following vehicle the intended deviation from a straight course.

The principal object of this invention is to provide means whereby the driver of a machine may automatically control the operation of remote indicators or signals placed on a car without the necessity of removing his hands from the steering wheel of a machine.

Another object of this invention is to provide means in connection with the indicators to give an audible alarm with the displaying of the stop signal.

A still further object of this invention is to provide the direction indicators adjacent the license plate in order to hide from view the indicators when they are not in operative positions.

An additional object of this invention is to provide an indicator which is clearly visible both in day time and night time.

Another object of this invention is to provide an indicator of the above mentioned character which will be cheap to manufacture, neat in appearance and relatively free from mechanical defects which often serve to make a signal inoperative.

Other objects and advantages of this invention will be apparent during the course of the following description:

In the drawings forming a part of this specification, and in which like numerals are employed to designate like parts throughout the same, Figure 1 is a side elevation of a steering wheel having my invention applied thereto.

Figure 2 is a top plan view of a contact carrying block,

Figure 3 is a cross sectional view taken on the line 3—3 of Figure 2,

Figure 4 is a bottom plan view of Figure 2,

Figure 5 is a side elevation of Figure 4,

Figure 6 is a top plan view of a circuit selector block,

Figure 7 is a cross sectional view taken on the line 7—7 of Figure 6,

Figure 8 is a perspective view of a contact member,

Figure 9 is a detail view of a clamping member,

Figure 10 is a side elevation of Figure 9.

It is a well known fact that the majority of automobile direction indicators or signals now upon the market, are operated through controls which necessitate the operator removing his hands from the steering wheel of the car at about the instant the change in direction is to be executed. This is a dangerous practice and is to be avoided, if possible. By referring to Figure 1, it will be noted that the controls of this signal are attached to the steering wheel and are adapted to be operated thereby. It is a further well known fact that many direction indicators serve the purpose of indicating directions in the day time, but at night time are useless. To overcome this objection, I have provided signals which, through medium of an electric bulb and illuminous signal arms, will indicate the change in direction at all hours.

In the drawings, wherein for the purpose of illustration is shown a preferred embodiment of my invention, the numeral 5 designates the steering post of an automobile, which is encased in a shell 6, which shell is rigidly attached to the car and remains stationary while the post 5 rotates with the steering wheel 7. At 8 and 9 I have shown two clamps, the construction of which is best shown in Figure 11 and consist of two semi-circular members 11 and 12 hinged at 13. These semi-circular members are attached to each other at 14 and are each provided with an arm 16. These arms each carry a screw 17, which screws form means of drawing these arms 16 towards each other. Screws 18 are positioned at convenient points in the semi-circular members 11 and 12, the function of which is to retain blocks 19 and 21, which blocks are preferably made of insulation and in two halves, as shown in Figures 2 and 6, these halves being jointed by means of dowel pins 22.

The block 21 is provided upon its face with the grooves 23 and 24, the groove 23 being an inner groove and the groove 24 being the outer groove. These two grooves are in turn connected by a passage 25, which passage is formed by removing the material between the two grooves in such a manner that the ends of the material will be beveled, as shown at 26 and 27.

Sliding contact members of the general shape shown in Figure 10, are adapted to be held in the grooves 23 and 24 and are indicated by the numerals 28 and 29. These sliding contact members extend from a point substantially adjacent the passage 26 around the grooves about two thirds of the way.

By referring now to Figures 4 and 5 it will be noted that slots 31 and 32 are cut through the under-surface of the block 21 beneath the grooves 23 and 24. These slots allow a binding post such as that indicated at 33 and 34 to extend therethrough, which binding posts serve the double purpose of forming terminals for wires 36 and 37, and at the same time form means whereby the contact members 28 and 29 may be shifted as desired.

Referring now to Figures 6 and 7, it will be noted that the block 19 is constructed of two halves held together by dowels similar to the construction employed for the block 21. This block 19 has a slot 38 formed therein within which is positioned a sliding contact 39, which contact carries a spring 41 coiled thereon, and is further provided with a spring 42 extending laterally therefrom and adapted to have its inner end 43 in contact with the steering post 5.

The normal position of the contact 39 is such that when the two blocks 19 and 21 are placed about the steering column and post, the contact 39 will take a position within the passage 25 between the beveled ends 26 and 27, and while in this position the clamp retaining the block 21 will be attached to the shell 6, and the clamp containing the block 19 will be attached to the post 5, the result being that the block 21 will be held stationary while the block 19 carrying the movable contact 39 will rotate thereon. This rotation will cause the contact 39 to come into contact with either the bevel end 26 or 27 and will cause the same to move into either groove 23 or 24, the result being that the contact will be established with either contacts 28 or 29.

Should the operator start to make a maneuver to the left, the block 19 will be caused to rotate carrying the contact 39 into the groove 24 and thence into contact with the contact 28. As the contact 39 is connected to the steering column 5, a circuit will be established in the usual manner to any convenient signalling apparatus.

Should a maneuver be made to the right, the contact 39 will then move into the groove 23 through contact with the beveled end 26 and cause current to flow from the column 5, through contact 39 to contact 29, to the signalling apparatus in the usual manner.

It will thus be seen that the signal is entirely automatic in its operation and when placed on a car, will operate continuously without effort upon the part of the operator, thereby relieving him of the mental strain and assuring him against forgetfulness.

It is to be understood that the form of my invention herewith shown and described, is to be taken as a preferred example of the same, and that various changes in the shape, size and arrangement of parts may be resorted to without departing from the spirit of the invention, or the scope of the subjoined claim.

Having thus described my invention, I claim:—

In an automobile signal, a steering post, a shell around said post, blocks secured to said post and said shell, said blocks overlying one another, concentric grooves formed in one of said blocks and extending substantially around the face of the block, one of said grooves being of shorter radius than the other of said grooves, a passage connecting said grooves, adjustable movable contacts mounted within said grooves, and a radially sliding contact mounted in the other of said blocks, said contact being adapted to normally lay in said passage and adapted to be moved into either of said concentric grooves for the purpose of contacting with one of said contacts.

In testimony whereof I affix my signature.

MILTON WOOLF.